(12) United States Patent
Gidseg et al.

(10) Patent No.: US 7,569,824 B2
(45) Date of Patent: Aug. 4, 2009

(54) LASER BEAM STEERING SYSTEM AND METHOD FOR USE IN A DIRECTIONAL INFRARED COUNTERMEASURES SYSTEM

(75) Inventors: Ronald A. Gidseg, Pasadena, CA (US);
Armando Corella, Azusa, CA (US);
Roderick W. Keaton, Altadena, CA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 275 days.

(21) Appl. No.: 11/547,202

(22) PCT Filed: Jun. 3, 2005

(86) PCT No.: PCT/US2005/019823

§ 371 (c)(1),
(2), (4) Date: Sep. 29, 2006

(87) PCT Pub. No.: WO2006/096190

PCT Pub. Date: Sep. 14, 2006

(65) Prior Publication Data

US 2007/0205366 A1   Sep. 6, 2007

Related U.S. Application Data

(60) Provisional application No. 60/576,542, filed on Jun. 3, 2004.

(51) Int. Cl.
*G01J 5/16* (2006.01)
(52) U.S. Cl. ............... 250/348; 250/347; 250/352; 250/353

(58) Field of Classification Search .......... 250/347, 250/348, 352, 353
See application file for complete search history.

(56) References Cited

U.S. PATENT DOCUMENTS 4,422,758 A * 12/1983 Godfrey et al. .......... 356/152.1
5,259,568 A * 11/1993 Amon et al. ............... 244/3.13
5,742,384 A     4/1998 Farmer (Continued)

FOREIGN PATENT DOCUMENTS

WO   WO 2006083278 A2 *  8/2006

*Primary Examiner*—David P Porta
*Assistant Examiner*—David S Baker
(74) *Attorney, Agent, or Firm*—Daniel J. Long; Paul F. Rusyn; Graybeal, Jackson LLP

(57) ABSTRACT

A laser beam steering module includes an optics assembly that directs a first portion of a laser beam through an output aperture and a second portion of through a sensing path. The optics assembly adjusts a position of the laser beam through the output aperture and sensing path responsive to position control signals. A sensor array in the sensing path receives the second portion of the laser beam and in response thereto generates electrical beam position signals indicating a position of laser beam through the output aperture. The electrical beam position signals have values that are a function of a temperature of the sensor array and are used in generating the position control signals to adjust the position of the laser beam as a function of the values of the electrical beam position signals. A thermal stabilization circuit stabilizes the temperature of the sensor array responsive to thermal control signals.

16 Claims, 4 Drawing Sheets

U.S. PATENT DOCUMENTS

| | | | |
|---|---|---|---|
| 5,923,418 A * | 7/1999 | Clark et al. | 356/153 |
| 6,104,478 A | 8/2000 | Giggenbach | |
| 6,428,173 B1 * | 8/2002 | Dhuler et al. | 359/872 |
| 6,490,076 B2 | 12/2002 | Pepper | |
| 6,515,285 B1 * | 2/2003 | Marshall et al. | 250/352 |
| 6,587,486 B1 | 7/2003 | Sepp et al. | |
| 6,687,036 B2 | 2/2004 | Riza | |
| 6,707,052 B1 * | 3/2004 | Wild et al. | 250/504 R |
| 2002/0058352 A1 | 5/2002 | Jacksen et al. | |
| 2003/0062468 A1 * | 4/2003 | Byren et al. | 250/216 |
| 2004/0004746 A1 | 1/2004 | Riza | |
| 2004/0021852 A1 | 2/2004 | DeFlumere | |
| 2004/0031906 A1 | 2/2004 | Glecker | |
| 2006/0022115 A1 * | 2/2006 | Byren | 250/201.9 |
| 2007/0075182 A1 * | 4/2007 | Fetterly | 244/3.16 |
| 2007/0201015 A1 * | 8/2007 | Gidseg et al. | 356/29 |

\* cited by examiner (Background)

(Background)

LASER BEAM STEERING SYSTEM AND METHOD FOR USE IN A DIRECTIONAL INFRARED COUNTERMEASURES SYSTEM

PRIORITY CLAIM

This application claims priority from U.S. Provisional Patent Application No. 60/576,542 filed on 3 Jun. 2004, which is incorporated herein by reference.

TECHNICAL FIELD

The present invention relates generally to countermeasures systems and methods, and more specifically to the control or steering of laser beams in directional infrared countermeasures systems and methods.

BACKGROUND OF THE INVENTION

A threat launch detection system is a system that detects a weapon being directed at a target, with the target typically containing the threat launch detection system. In response to detecting a weapon directed at the target, which will be referred to as a threat or event throughout the present description, the threat launch detection system typically takes countermeasures to prevent the weapon from impacting the target. For example, an airplane may include a threat launch detection system designed to detect missiles fired at the airplane. When the system detects a missile, the system typically takes appropriate countermeasures in an attempt to prevent the missile from impacting the airplane, such as transmitting a signal to "jam" electronic circuitry in the missile that is guiding the missile towards the target.

A conventional threat launch detection system is illustrated in FIG. 1, which more specifically depicts a block diagram of a directional infrared countermeasures (DIRCM) system 100. The DIRCM system 100 includes a missile warning system 102 that detects the presence of a weapon or threat 104 directed at an airplane or other vehicle (not shown) containing the system. In the example of FIG. 1, the threat 104 is a missile that has been fired at the airplane containing the DIRCM system 100. The missile 104 includes a guidance system (not shown) for sensing infrared energy emitted by the airplane and for directing the missile towards the airplane.

The missile warning system 102 is typically a passive system that includes a sensor array (not shown) in combination with suitable optics (not shown) to provide a relatively wide field of view WFOV for missiles 104. The wide field of view WFOV is the region of space surrounding the system 100 in which missiles 104 can be detected. The sensor array in the missile warning system 102 may be an array of ultraviolet (UV) or infrared (IR) sensors that capture a series of images within the field of view WFOV. Processing circuitry (not shown) in the missile warning system 102 analyzes the captured images to detect a threat and generates a coarse directional determination indicating an arrival angle at which the missile or other threat 104 is approaching the airplane containing the system 100.

The missile warning system 102 provides this determined arrival angle to a system controller 106 which, in response to the determined angle, applies signals to a fine tracking system 108 to position a fine track sensor (not shown) toward the threat 104 at the determined angle. More specifically, this fine track sensor in the system 108 is typically mounted on a gimbal (not shown) that rotates in response to the signals from the system controller 106 to direct the fine track sensor towards the determined angle and thereby toward the approaching missile 104. The fine track sensor has a narrow field of view NVOV that is much smaller than the wide field of view WFOV to allow the fine tracking system 108 to precisely track the missile 104 or other threat positioned within the narrow field of view.

The fine tracking system 108 further includes a jamming laser (not shown) that is also directed towards the missile 104 by the rotating gimbal. Once the gimbal has positioned the fine track sensor and jamming laser towards the missile 104, the jamming laser is turned on and an infrared jamming laser beam from the laser illuminates the approaching threat 104 missile. This infrared laser energy is modulated in such a way that the when the guidance system in the missile 104 senses this energy the guidance system directs the missile away from the airplane. The fine tracking sensor in the fine tracking system 108 senses the position of the missile 104 during this time to accurately illuminate the missile 104 with energy from the jamming laser. This overall operation of the fine tracking sensor and jamming laser in the fine tracking system 108 may be referred to as "tracking" and "jamming" the threat 104.

The alignment of the jamming laser relative to a mounting datum (not shown) to which the laser is mounted and to the fine tracking sensor must be accurate for proper operation of the fine tracking system 108 in tracking and jamming the threat 104, as will be appreciated by those skilled in the art. As a result, part of the installation and configuration or set-up of the DIRCM system 100 includes properly aligning the jamming laser to the mounting datum. This is typically a manual adjust and set procedure. For example, in one approach an installation person makes manual adjustments to mirrors that contained in optics that direct the laser beam. The installation person manually adjusts these mirrors while looking at the output location of the laser beam using a cooled IR camera to thereby properly align the laser beam. This alignment of the jamming laser beam, however, is time consuming and must be periodically repeated because the alignment tends to drift over time. Also, the alignment is a function of environmental conditions that may cause errors during operation of the tracking and jamming operation of the fine tracking system 108.

In another approach, the jamming laser includes a reference laser and this laser is visible by an un-cooled sensor. Control circuitry then automatically moves a mirror to position the reference laser beam in the correct location to thereby properly position the jamming laser beam. There is no guarantee with this approach that the reference laser is properly aligned to the jamming laser beam. Moreover, with this approach lateral movement of the reference laser beam can not be separated from angular movement and thus alignment accuracy of the jamming laser beam is compromised.

Regardless of which one of these prior approaches for proper alignment of the jamming laser beam is utilized, the jamming laser beam generated by the jamming laser tends to some degree or another to change direction over time. This change is an inherent characteristic of lasers and presents a design issue for the DIRCM system 100 in that the system must have a beam divergence adequate to accommodate changes in direction or angle of the laser beam. Alternatively, the laser must be designed and manufactured in such a way as to ensure that changes in the direction or angle of the jamming laser beam are negligible.

FIG. 2 is a graph illustrating typical shifts in beam position of a 1 milliradian radius laser beam as the beam shifts during ten minutes of operation of the laser generating the beam. The position of the laser beam in a first direction designated the X direction and in a second direction designated the Y direction are shown over seven short intervals T1-T7. During each of these time intervals T1-T7, the top line indicates shifting of the laser beam in the X direction and the bottom line indicates shifting of the beam in the Y direction. Over the total ten minute (600 seconds) time period covered by the graph, the centroid of the laser beam shifts over 2 milliradians in the Y direction as indicated by a position of the beam at the start of interval T1 of approximately 7.3 milliradians and a position of the beam at the end of interval T7 of approximately 5.2 milliradians. If the laser beam was expanded to accommodate this shift, and still given a 1 milliradian error budget to the rest of the system, 90% of the beam energy would be wasted, as will be appreciated by those skilled in the art.

Current approaches that mechanically monitor and adjust the angle of the laser beam have several potential issues. The first is that sensors sensitive laser energy at around 4 microns need to be cooled. Second, mirror actuators are susceptible to vibration and shock and have limited frequency responses for adjusting the position of the laser beam. A third potential issue is that most control loops for controlling such mirrors and actuators are digital control loop and thus have the accompanying issue of aliasing with the movement and firing frequencies of the laser.

There is a need for improved methods and systems for aligning the position of a laser beam and maintaining this alignment over time in countermeasures systems.

SUMMARY OF THE INVENTION

According to one aspect of the present invention, a laser beam steering module includes an optics assembly adapted to receive position control signals. The optics assembly is operable to direct a first portion of a laser beam through an output aperture and a second portion of the laser beam through a sensing path. The optics assembly is further operable to adjust a position of the laser beam through the output aperture and the sensing path responsive to the position control signals. An uncooled sensor array is positioned in the sensing path to receive the second portion of the laser beam and is operable responsive to the received portion of the laser beam to generate electrical beam position signals indicating a position of laser beam through the output aperture. The electrical beam position signals having values that are a function of a temperature of the sensor array and are adapted to be used in generating the position control signals to adjust the position of the laser beam as a function of the values of the electrical beam position signals. A thermal stabilization circuit is coupled to the sensor array and is adapted to receive thermal control signals. The thermal stabilization circuit is operable responsive to the thermal control signals to stabilize the temperature of the sensor array.

DETAILED DESCRIPTION OF PREFERRED EMBODIMENTS

Figure 1:
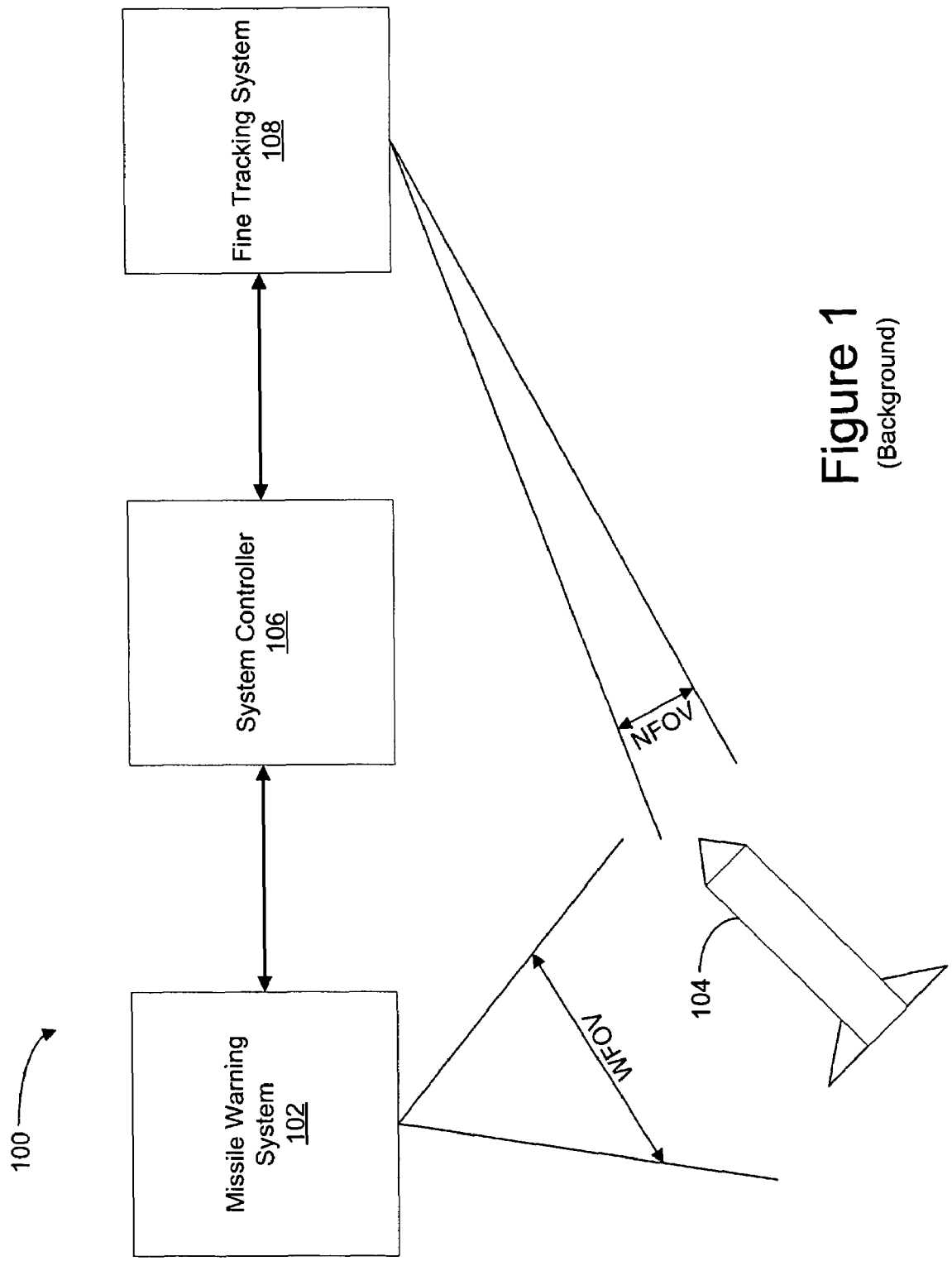
FIG. 1 is a functional block diagram illustrating the operation of a conventional directional infrared countermeasure system.
Figure 2:
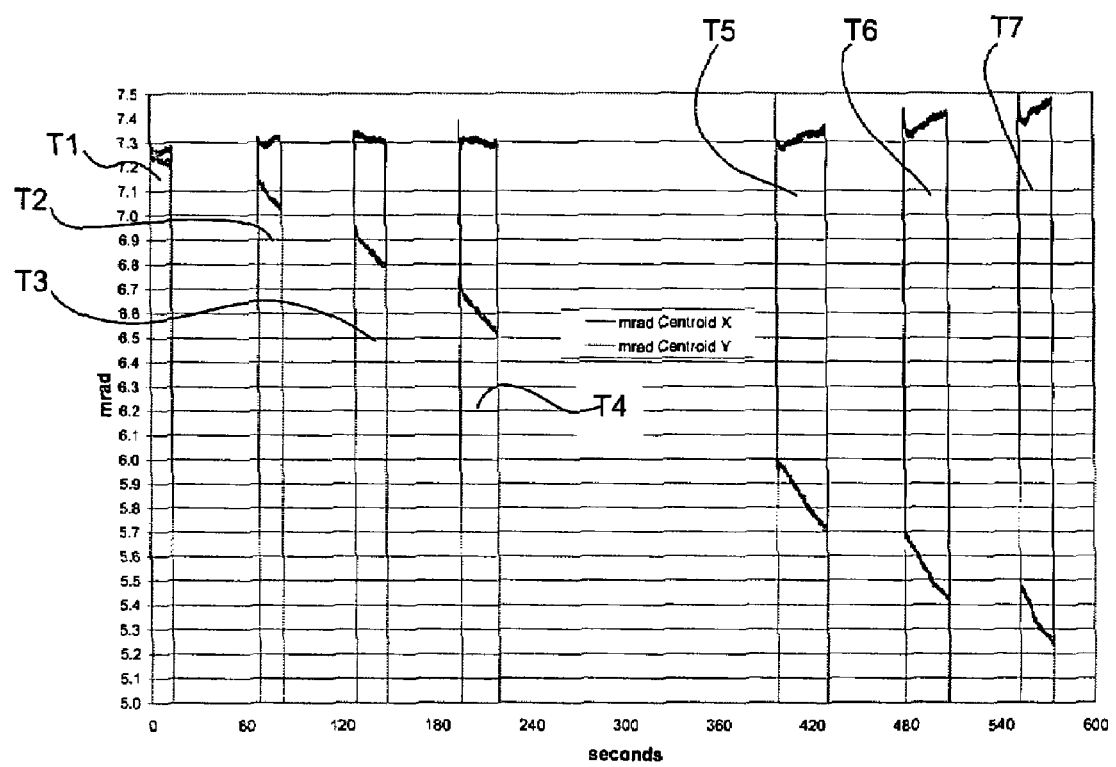
FIG. 2 is a graph illustrating typical shifts in beam position of a 1 milliradian radius laser beam as the beam shifts during ten minutes of operation of the laser generating the beam.
Figure 3:
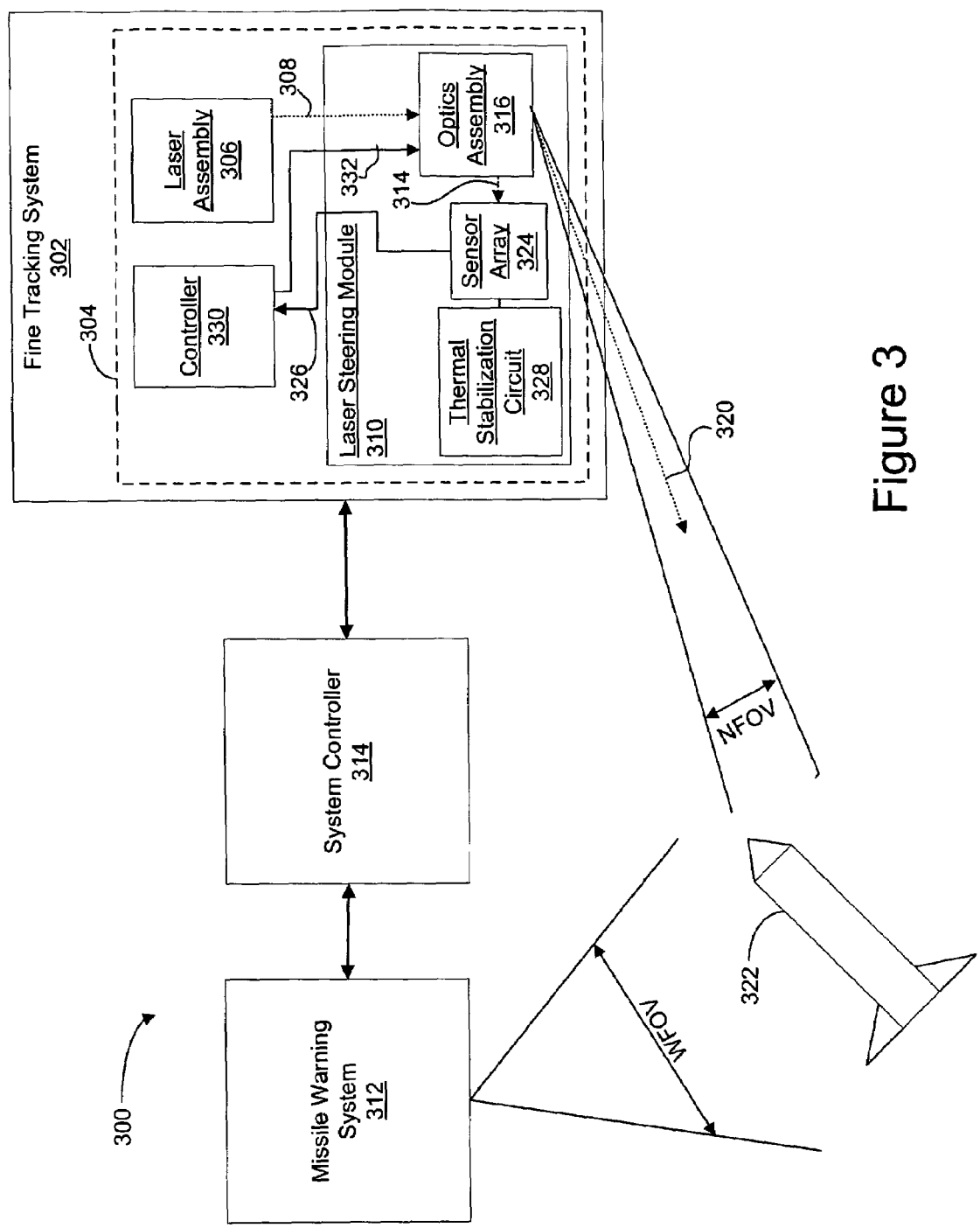
FIG. 3 is a functional block diagram of a directional infrared countermeasure system including a fine tracking system having a laser steering module according to one embodiment of the present invention.

FIG. 3 is a functional block diagram of a directional infrared countermeasures system 300 including a fine tracking system 302 containing a laser jamming component 304 according to one embodiment of the present invention. The laser jamming component 304 includes a laser assembly 306 that generates a laser beam 308 that is applied to a laser steering module 310. In operation, the laser steering module 310 includes thermal-stabilization circuitry and optics that provide accurate sensing of a position of the laser beam 308 and that adjust for variations in this position over time to ensure proper operation of the fine tracking system 302, as will be explained in more detail below. The countermeasures system 300 further includes a missile warning system 312 and a system controller 314 that operate in the same way as previously described for the missile warning system 102 and system controller 106 of FIG. 1. Thus, for the sake of brevity, the operation of the missile warning system 312 and system controller 314 will not again be described in detail.

In the following description, certain details are set forth in conjunction with the described embodiments of the present invention to provide a sufficient understanding of the invention. One skilled in the art will appreciate, however, that the invention may be practiced without these particular details. Furthermore, one skilled in the art will appreciate that the example embodiments described below do not limit the scope of the present invention, and will also understand that various modifications, equivalents, and combinations of the disclosed embodiments and components of such embodiments are within the scope of the present invention. Embodiments including fewer than all the components of any of the respective described embodiments may also be within the scope of the present invention although not expressly described in detail below. Finally, the operation of well known components and/or processes has not been shown or described in detail below to avoid unnecessarily obscuring the present invention.

The laser steering module 310 includes an optics assembly 316 that receives the laser beam 308 and splits the laser beam into a first portion 318 and a second portion 320. The optics assembly 316 directs the second portion 320 of the laser beam 308 outward into a narrow field of view NFOV to "jam" a threat 322 initially detected by the missile warning system 312. The optics assembly 316 directs the first portion 318 of the laser beam 308 to provide a far-field view of this portion of the beam to an uncooled array 324 of infrared sensors. In response to the first portion 318 of the laser beam 308, the array 324 generates beam position signals 326 indicating a position of the laser beam. A thermal stabilization circuit 328 is coupled to the array 324 and controls or stabilizes the temperature of the sensors to ensure the temperature of the sensors is relatively constant or stable and in this way the beam position signals 326 from the sensors do not vary as a function of temperature.

In response to the beam position signals 326 from the sensor array 324, a controller 330 applies position control signals 332 to the optics 310 to thereby adjust the position of the first and second portions 318 and 320 of the laser 308. In this way, the sensor array 324 senses the position of the first portion 318 of the laser beam 308 and generates corresponding beam position signals 326. The position of the second portion 320 of the laser beam 308 is a function of the position of the first portion 318, and in this way the controller 330 utilizes the beam position signals 326 to control the optics assembly 316 to thereby adjust the position of the second portion of the laser beam to properly illuminate threats 322 within the narrow field of view NFOV. The alignment or position of the jamming laser beam 320 relative to a mounting datum (not shown) and to a fine tracking sensor (not shown) must be accurate for proper operation of the fine tracking system 302 in tracking and jamming the threat 322. Note that the controller 330 may also generate additional control signals 334 to control other components in the laser jamming component 304, such as the thermal stabilization circuit 328.

In operation of the countermeasures system 300, the missile warning system 312 detects the presence of a threat 322 directed at an airplane or other vehicle (not shown) containing the system. As previously mentioned, the missile warning system 312 is typically a passive system that includes a sensor array (not shown) in combination with suitable optics (not shown) to provide a relatively wide field of view WFOV for threats 322. The sensor array in the missile warning system 102 may be an array of ultraviolet (UV) or infrared (IR) sensors that capture a series of images within the field of view WFOV. Processing circuitry (not shown) in the missile warning system 312 analyzes the captured images to detect a threat 322 and generates a coarse directional determination indicating an arrival angle at which the threat is approaching the airplane containing the system 300.

The missile warning system 312 provides this determined arrival angle to the system controller 314 which, in response to the determined angle, applies signals to the fine tracking system 302 to position a fine track sensor (not shown) toward the threat 322 at the determined angle. More specifically, this fine track sensor in the fine tracking system 302 is typically mounted on a gimbal (not shown) that rotates in response to the signals from the system controller 314 to direct the fine track sensor towards the determined angle and thereby toward the approaching threat 322. The fine track sensor has the narrow field of view NFOV that is much smaller than the wide field of view WFOV to allow the fine tracking system 302 to precisely track a threat 322 positioned within the narrow field of view.

Once the fine tracking system 302 is properly positioned and begins tracking the threat 322, the laser assembly 306 generates the laser beam 308 and the optics assembly 316 directs the second portion 320 of this laser beam into the narrow field of view NFOV to "jam" the threat 322. During this operation, the sensor array 324 develops the beam position signals 326 indicating the position of the first portion 318 of the laser beam and thereby indicating the position of the second portion 320 of the laser beam that is jamming the threat 322. In response to the beam position signals 326 from the sensor array 324, the controller 330 generates the position control signals 332 as required to control the optics assembly 316 to adjust the position of the first and second portions 318 and 320 of the laser beam 308.

In the system 300, the sensor array 324, controller 330, and optics assembly 316 operate in combination to maintain the alignment or proper position of the second portion 320 of the laser beam 308. As the response of the sensors in the sensor array 324 would normally change as a function of temperature, the thermal stabilization circuit 328 maintains the temperature of the sensor array at a desired value and thus eliminates or greatly reduces any such changes. Also, in the laser jamming component 304 of FIG. 3 a control loop including the sensor array 324, controller 330, and optics assembly 316 may be implemented entirely through analog circuitry, and in this way aliasing effects that may result with digital implementations of such a control loop are eliminated. Finally, note that the second portion 318 of the laser beam 308 provided by the optics assembly 316 provides the sensor array 324 with a far-field view of this portion of the laser beam. Such a far-field view ensures that the optics assembly 316 only corrects for angular changes of the laser beam 308 (and corresponding angular changes of the first and second portions 318 and 320) while displacement effects are ignored since correction of such displacement effects is not typically required for proper operation of the system 300. The controller 330 may include flash memory (not shown) for storing various operating parameters of the system 300.

Figure 4:
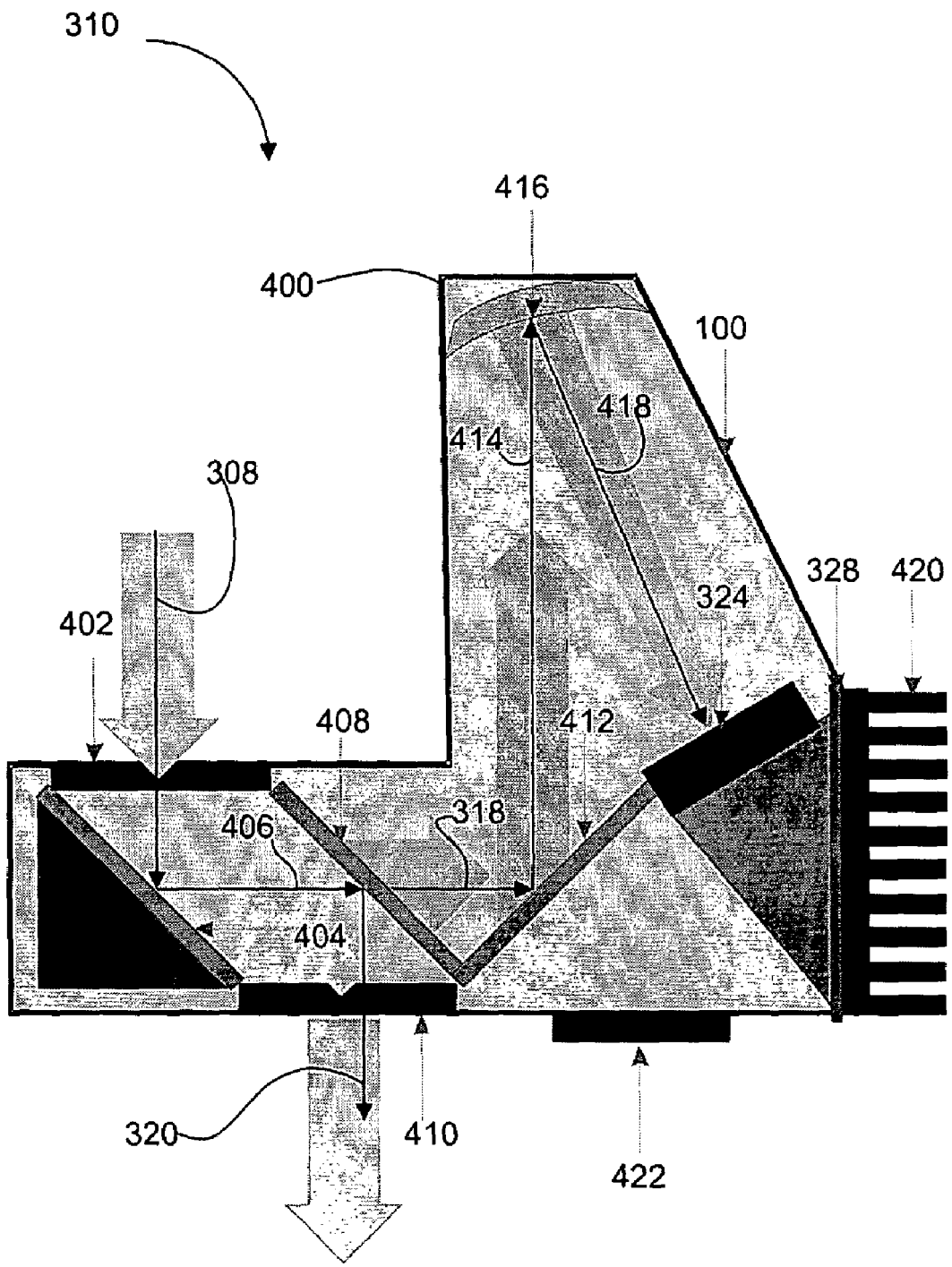
FIG. 4 is a functional cross-sectional view of the laser steering module of FIG. 3 according to one embodiment of the present invention.

FIG. 4 is a functional cross-sectional view of the laser steering module 310 of FIG. 3 according to one embodiment of the present invention. The laser beam steering module 310 includes a housing 400 having an entrance aperture 402 through which the laser beam 308 enters the housing. The entrance aperture 402 may be merely an opening or may include a panel that is transparent to the laser beam 308, with different suitable materials being selected depending on the wavelength of the laser beam. In one embodiment, the aperture 402 has a diameter of approximately 1 cm.

The laser beam 308 propagates through the entrance aperture 402 and reflects off a front surface of a micro-electromechanical system (MEMS) mirror 404. Although the mirror 404 is described as being a MEMS component in the embodiment of FIG. 4, the mirror need not be a MEMS component but can be formed from other equivalent low-mass agile mirrors. The beam reflected off the MEMS mirror 404 is designated as a reflected beam 406, and the MEMS mirror 404 rotates about two axes in response to applied control signals (not shown) to thereby redirect or steer the reflected beam 406 in a desired direction. More specifically, the MEMS mirror 404 rotates about the two axes to reposition the reflected beam 406 in two dimensions relative to a surface of a beam splitter 408. The beam splitter 408 splits the reflected beam 406 into the first portion 318 (FIG. 3) and into the second portion 320 (FIG. 3), with the second portion typically containing 95% or more of the power of the laser beam 308 and the first portion containing the remaining power. The second portion 320 propagates an exit aperture 410 that may be merely an opening or may include a panel that is transparent to the second portion. This panel functions as an alignment datum for the rest of the fine tracking system 302 (FIG. 3).

The first portion 318 of the reflected beam 406 reflects off a front surface of a flat mirror 412, with this reflected beam being designated as a beam 414. The reflected beam 414 thereafter reflects off a front surface of an off-axis parabolic mirror 416 that functions to collimate the reflected beam and thereby generate a collimated beam 418. The collimated beam 418 is incident upon the sensor array 324 (FIG. 3), which is an un-cooled infrared quad cell detector in one embodiment of the present invention. Such a quad cell detector includes four infrared sensors arranged adjacent one another in two rows and two columns. The off-axis parabolic mirror 416 has a focal point at a front surface of the quad cell detector 324, which develops the beam position signals 326 (not shown in FIG. 4) in response to the incident collimated beam 418.

The collimated beam 418 provides the quad cell detector 324 with a far-field view of this beam since the collimated beam has parallel rays as would be the case from a source very far from the detector. The thermal stabilization circuit 328 (FIG. 3) is physically coupled to the quad cell detector 324 to cool the detector and maintain each of the cells at a desired temperature. A heat sink 420 may be coupled to the stabilization circuit 328 to dissipate heat received from the detector 324. The thermal stabilization circuit 328 may include comparator and reference circuitry utilized to control the temperature of the quad cell detector 324. An electrical connector 422 is formed in the housing 400 and includes connections to components in the steering module 310 to provide power to such components and also to provide signals from such components, like the beam position signals 326 from the sensor array 324, to the controller 330 (FIG. 3).

In the embodiment of FIG. 4, the exact relative orientation of the components in the laser steering module 310 can be tailored to the overall laser/beam director integration in the system. In the laser steering module 310 the quad cell detector 324 is ideally positioned precisely at the focal point of the parabolic mirror 416. This is true because even though the quad cell detector 324 is insensitive to uniform defocusing of the collimated beam 418 any deviation from having the focal point of the parabolic mirror 416 at the quad cell detector means that the steering module 310 is susceptible to centroid shifts if the laser beam 308 is displaced rather than tilted. As the overall module 310 is not sensitive to displacements of the laser beam 308 but is sensitive to angle changes of the laser beam, the quad cell detector 324 must only provide information on angle, which is why the first portion 318 of the laser beam 308 is collimated with the parabolic mirror 416 rather than using a plane mirror.

Dimensions are ordinarily not critical in the module 310, but what is typically maintained is the shape of the module meaning no deformations of the optical path. Also note that threshold levels may need to be added to the beam position signals 326 from the quad cell detector 324 to ensure that corrections for "noise centroid" shifts in between pulses of the laser beam 308 are not attempted to be corrected for by the laser jamming component 304. Electrical interconnections inside the module 310 may be via flex circuit.

One skilled in the art will understood that even though various embodiments and advantages of the present invention have been set forth in the foregoing description, the above disclosure is illustrative only, and changes may be made in detail, and yet remain within the broad principles of the invention. For example, many of the components described above may be implemented using either digital or analog circuitry, or a combination of both, and also, where appropriate, may be realized through software executing on suitable processing circuitry. It should also be noted that the functions performed by the components 302-334 in the system 300 of FIG. 3 can be combined to be performed by fewer elements and divided and performed by more elements, depending upon the application of the system and other factors as well. Therefore, the present invention is to be limited only by the appended claims.

What is claimed is:

1. A directional countermeasures system, comprising:
a missile warning subsystem operable to capture images within a wide field of view and to identify a threat within the wide field of view from the captured images;
a system controller coupled to the missile warning subsystem and operable to generate position control signals responsive to the identified threat from the missile warning subsystem; and
a fine tracking subsystem coupled to the system controller and operable to capture images within a narrow field of view and to track and perform countermeasures on a threat identified in the captured narrow field of view images, and the fine tracking subsystem operable to position a laser jamming component responsive to the position control signals, the laser jamming component including a laser beam steering module that includes,
an optics assembly adapted to receive position control signals and being operable to direct a first portion of a laser beam through an output aperture and a second portion of the laser beam through a sensing path, the optics assembly operable to adjust a position of the laser beam through the output aperture and the sensing path responsive to the position control signals;
a sensor array positioned in the sensing path to receive the second portion of the laser beam and operable responsive to the received portion of the laser beam to generate electrical beam position signals indicating a position of laser beam through the output aperture, the electrical beam position signals having values that are a function of a temperature of the sensor array and being adapted to be used in generating the position control signals to adjust the position of the laser beam as a function of the values of the electrical beam position signals; and
a thermal stabilization circuit coupled to the sensor array and adapted to receive thermal control signals, the thermal stabilization circuit operable responsive to the thermal control signals to stabilize the temperature of the sensor array.

2. The directional countermeasures system of claim 1 wherein the laser jamming component further comprises:
a laser assembly operable to generate the laser beam; and
a control circuit coupled to the optics assembly and the sensor array and operable responsive to the beam position signals from the sensor array to generate the position control signals that are applied to the optics assembly to control the position of the laser beam through the output aperture.

3. The laser beam steering module of claim 2 wherein the control circuit includes an analog control loop that receives the beam position signals and feeds back the position control signals.

4. The directional countermeasures system of claim 1 wherein the optics assembly further comprises:
a MEMS element having a reflective surface positioned to receive the laser beam and to provide a reflected laser beam corresponding to the laser beam reflected off this reflective surface, the MEMS element being operable responsive to the position control signals to adjust an orientation of the reflective surface in two dimensions relative to the laser beam;
a beam splitter positioned to receive the reflected laser beam and operable to split the reflected laser beam into the first and second portions; and
a collimator positioned in the sensing path to provide the sensor array with a far-field view of the second portion of the laser beam.

5. The directional countermeasures system of claim 4 wherein the collimator comprises a parabolic mirror.

6. The laser beam steering module of claim 1 wherein the thermal stabilization circuit further comprises a heat sink operable to dissipate heat generated by the sensor array.

7. The laser beam steering module of claim 1 wherein the sensor array comprises a quad-cell array including four infrared sensors positioned in an array of two rows and two columns.

8. The laser beam steering module of claim 1 wherein a collimator comprises a parabolic mirror.

9. The directional countermeasures system of claim 1 wherein the missile warning subsystem includes ultraviolet sensors and the fine tracking subsystem includes infrared sensors.

10. The directional countermeasures system of claim 1 wherein the laser jamming component includes an infrared laser assembly for generating modulated infrared radiation that is applied to the optics assembly.

11. A method of adjusting a position of a laser beam to perform directional countermeasures, comprising:
  capturing images within a wide field of view;
  identifying a threat within the wide field of view from the captured images;
  generating position control signals responsive to the identified threat;
  capturing images within a narrow field of view; and
  tracking and performing countermeasures on a threat identified in the captured narrow field of view images, the operations of tracking and performing countermeasures comprising,
    positioning a laser beam responsive to the position control signals, wherein the operation of positioning further comprises,
      reflecting the laser beam;
      propagating a first portion of the reflected laser beam through an output path; and
      propagating a second portion of the reflected laser beam through a sensing path;
      collimating the second portion of the laser beam propagating through the sensing path;
      sensing the collimated laser beam in the sensing path to determine a position of the collimated laser beam, the position of the collimated laser beam being a function of a position of the output path through which the first portion of the reflected laser beam propagates;
      compensating the operation of sensing as a function of temperature; and
      adjusting the operation of reflecting the laser beam to adjust the position of the output path through which the first portion of the reflected laser beam propagates in response to the operation of sensing the collimated laser beam.

12. The method of claim 11 wherein adjusting the operation of reflecting the laser beam comprises controlling an orientation of a reflective element in two dimensions responsive to the operation of sensing the collimated laser beam to thereby control the position of the output path.

13. The method of claim 12 further comprising:
  generating a beam position signal responsive to sensing the collimated laser beam, the beam position signal indicating the position of the collimated laser beam; and
  generating a feedback control signal having a value that is a function of the beam position signal; and
  controlling the orientation of the reflective element responsive to the feedback control signal.

14. The method of claim 11 wherein collimating the second portion of the laser beam propagating through the sensing path comprises reflecting the second portion of the laser beam off a parabolic mirror.

15. The method of claim 11 wherein propagating a first portion of the reflected laser beam through an output path and propagating a second portion of the reflected laser beam through a sensing path comprises splitting the reflected laser into a primary beam that propagates through the output path and a secondary beam that propagates through the sensing path, wherein the primary beam has at least 95% of the power of the reflected laser beam and the secondary beam has the remainder of the power of the reflected laser beam.

16. The method of claim 11 wherein sensing the collimated laser beam includes using infrared sensors to sense the collimated laser beam.

\* \* \* \* \*